(12) United States Patent
Kohlruss et al.

(10) Patent No.: US 7,871,362 B2
(45) Date of Patent: Jan. 18, 2011

(54) COVER MADE OF WOVEN PILE

(76) Inventors: Gregor Kohlruss, Zur Rampe 5, 46414 Rhede (DE); Hubert Wiesner, Grüner Weg 21, 46354 Südlohn (DE); Oliver Griebe, Mühlenweg 22, 46414 Rhede (DE)

( * ) Notice: Subject to any disclaimer, the term of this patent is extended or adjusted under 35 U.S.C. 154(b) by 1272 days.

(21) Appl. No.: 10/554,492

(22) PCT Filed: Apr. 21, 2004

(86) PCT No.: PCT/EP2004/004185

§ 371 (c)(1),
(2), (4) Date: Jan. 9, 2006

(87) PCT Pub. No.: WO2004/094074

PCT Pub. Date: Nov. 4, 2004

(65) Prior Publication Data

US 2006/0216459 A1    Sep. 28, 2006

(30) Foreign Application Priority Data

Apr. 24, 2003   (DE) ................................. 103 18 680

(51) Int. Cl.
*A01B 29/00* (2006.01)
*B29C 63/08* (2006.01)
(52) U.S. Cl. ............................ 492/29; 492/41; 492/43; 492/44; 492/55; 29/895
(58) Field of Classification Search .................. 492/29, 492/13, 55, 41, 43, 44; 29/895, 895.33
See application file for complete search history.

(56) References Cited

U.S. PATENT DOCUMENTS

| | | | | | |
|---|---|---|---|---|---|
| 2,260,816 | A | * | 10/1941 | Albin | 112/63 |
| 2,294,245 | A | * | 8/1942 | Schlegel | 15/230.13 |
| 2,751,936 | A | * | 6/1956 | Dunlap et al. | 138/150 |
| 2,884,957 | A | * | 5/1959 | Harris et al. | 138/122 |
| 3,610,693 | A | | 10/1971 | Solarek | |
| 6,231,711 | B1 | | 5/2001 | Roberts et al. | |
| 6,685,121 | B1 | | 2/2004 | Jelinek et al. | |
| 2001/0045014 | A1 | | 11/2001 | Polzin | |
| 2002/0091051 | A1 | | 7/2002 | Sekar | |

FOREIGN PATENT DOCUMENTS

EP    1 232 849 A2    8/2002

OTHER PUBLICATIONS

International Search Report .
International Search Report, (Completion date of Aug. 11, 2004).

* cited by examiner

*Primary Examiner*—David P Bryant
*Assistant Examiner*—Sarang Afzali
(74) *Attorney, Agent, or Firm*—Collard & Roe, P.C.

(57) ABSTRACT

The invention relates to an exchangeable cylinder jacket-shaped cover made of pile whose threads radially project outward. The aim of the invention is to provide a cover of this type, which has a high cohesive strength both in the axial as well as radial direction and which also has an outer and inner cylindrical contour that is as continuous as possible. To this end, the invention provides that the cover consists of an endless helically wound pile strip whose edges are interconnected by an endless helically running seam without forming a step that disrupts the cylindrical outer contour.

4 Claims, 1 Drawing Sheet

COVER MADE OF WOVEN PILE

CROSS REFERENCE TO RELATED APPLICATIONS

Figure 1:
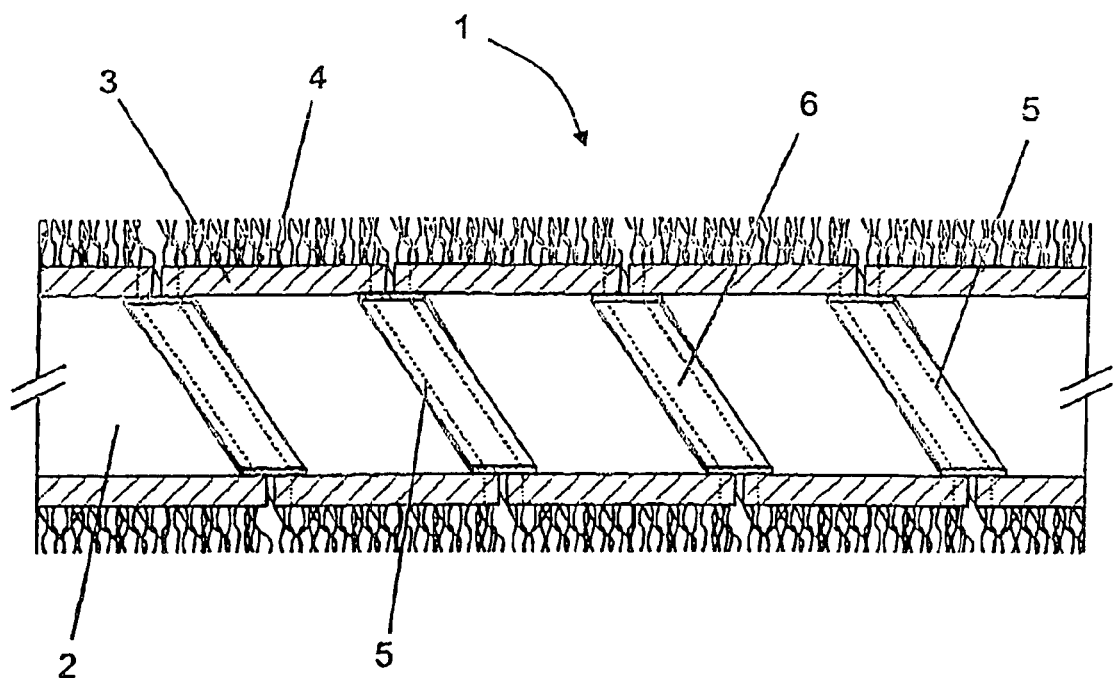

Applicants claim priority under 35 U.S.C. §119 of German Application No. 103 18 680.8 filed Apr. 24, 2003. Applicants also claim priority under 35 U.S.C. §365 of PCT/EP2004/004185 filed Apr. 21, 2004. The international application under PCT article 21(2) was not published in English.

The invention relates to a replaceable cover made of woven pile, in the shape of a cylinder mantle, the pile of which projects radially outward.

According to the state of the art, it is known to provide the rollers of paint rollers, for example, with a cover made of pile material, which is rigidly connected with the roller body of the paint roller, so that the roller body imparts the necessary strength to the cover.

This is fundamentally different in the case of replaceable covers, which are not connected with the roller body that carries them. This applies, for example, for replaceable covers for washing brushes in car wash systems, or for replaceable covers on filter cartridges. Such replaceable cylindrical covers must be able to withstand great stress both in the axial direction and in the circumferential direction, and should furthermore be disrupted as little as possible at least in their outside contour, because otherwise the washing process of the rotating washing brushes or the cleaning process of the filter, which is also a rotating process, would be disrupted. In particular, seams that run axially are disruptive, because they hinder smooth round running during the rotation. Weaving methods for the production of woven pile in tube form are not known according to the state of the art, and would certainly be too complicated, particularly if covers in cylinder mantle shape having different diameters would have to be produced.

It is therefore the task of the invention to produce covers made of woven pile, in the shape of a cylinder mantle, which have strong cohesion both in the axial and in the radial direction, and in which the outside and inside cylinder contour are disrupted as little as possible. In particular, there are not supposed to be any projections on the outside circumference, which would hinder the rotation.

The object of the invention is a replaceable cover made of woven pile, in the shape of a cylinder mantle, the pile of which projects radially outward, in which the cover consists of an endless, helically wound pile tape, the edges of which are connected with one another without the formation of a step that disrupts the cylindrical outside contour, by means of an endless seam that runs helically. The cover in the shape of a cylinder mantle, according to the invention, can be composed of an endless, helically wound pile tape, in any desired length. The cover in the shape of a cylinder mantle is stabilized in both directions, both the circumferential direction and the axial direction, by means of the seam that runs helically. Another advantage consists in the fact that the seam, although it is axially displaced, is distributed uniformly over the circumference, so that the irregularities that unavoidably occur with any seam cannot be disruptive during the rotation of a washing brush or during the rotational cleaning of a filter cartridge. Because the formation of a step that disrupts the cylindrical outside contour is avoided in the production of the helically running seam, these disruptions are practically not noticeable any longer.

A first embodiment of the invention provides that the edges of the pile tape abut one another in the region of the helically running seam, and are held together by means of a thin textile tape that is attached to the basic woven material from the inside. In this configuration of the cover, the outside contour remains absolutely cylindrical. Slight disruptions in the seam region occur at most as the result of the textile tape that is attached to the basic woven fabric on the inside. However, this textile tape can be configured to be so thin that these disruptions do not occur at all in the region of the outside contour of the cover, and are practically no longer perceivable in the inside region of the cover.

An alternative but particularly preferred embodiment of the cover according to the invention provides that the edges of the pile tape overlap in the region of the helical seam, whereby the pile at the edges of the pile tape is shortened to such an extent in the overlap region that the outside contour of the cover runs in constant manner, to the greatest possible extent. This embodiment of the invention imparts particularly great stability to the cover, because the two basic woven fabrics are directly connected with one another in the seam region. Nevertheless, the wall thickness in the seam region is only changed slightly by the shortening of the woven pile fabric, so that the desired, almost constant cylindrical outside contour is obtained. In the case of the exemplary embodiment last mentioned, it is practical if the pile of the edge that lies underneath, in each instance, is shortened to the height of the basic woven fabric in the overlap region. As a result, the two basic woven fabrics lie directly on top of one another in the overlap region, and can therefore be connected with one another in particularly intimate manner. By means of this measure, it is also possible to prevent pile threads in the edge region from losing their hold and being pulled out. This is because in this case, all of the pile threads in the edge region are at a sufficient distance from the outermost edge and therefore do not lose their hold. Because the pile of the lower-lying edge is shortened to the height of the basic woven fabric, according to the embodiment just described, an almost constant cylindrical contour also occurs in the interior of the cover.

It is practical if the seams are sewn with needle and thread. Such seams, sewn with needle and thread, are particularly stable and stiffen the cover the least. By means of suitable measures, it is possible to lay the pile threads on the top of the pile to the side during the sewing process, so that the loop of the sewing thread rests directly against the top of the basic woven fabric and leaves all of the pile threads sufficiently free so that the pile surface is undisrupted from the outside, even in the region of the seam.

Alternatively, the seams can also be glued or bonded. A prerequisite for this is a suitable adhesive or suitable materials for the basic woven fabric, which can be bonded.

Figure 2:
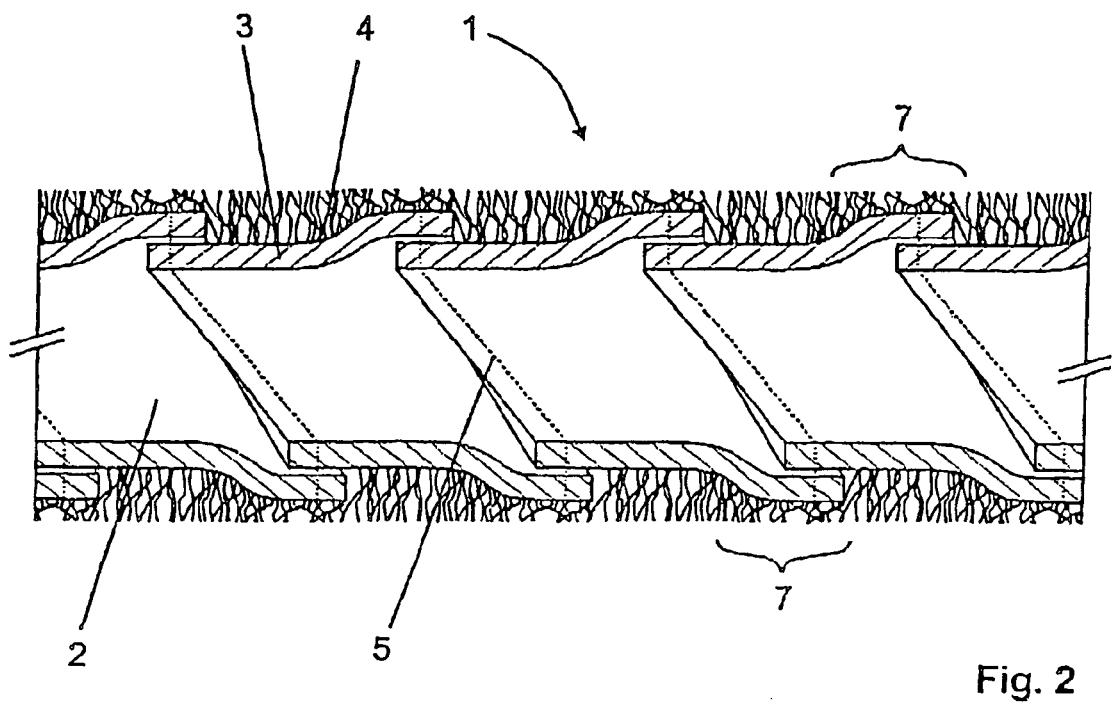

Exemplary embodiments of the invention will be explained in greater detail in the following, using a drawing. This shows:

FIG. 1: a first cover according to the invention, with a textile tape sewn underneath, in a cross-sectional side view;

FIG. 2: a second embodiment of the cover according to the invention, in a cross-sectional side view.

In FIGS. 1 and 2, the cover according to the invention is designated as a whole with the reference number 1, in each instance. The cover 1 consists of an endless, helically wound pile tape 2, whereby the latter is composed of a basic woven fabric 3 and pile threads 4 that project radially outward. The edges of the pile tape 2 are connected with one another by means of endless seams 5 that run helically. In the figures, it is clearly evident that the covers shown have an almost constant cylindrical outside contour.

In the case of the exemplary embodiment of the cover 1 shown in FIG. 1, the edges of the pile tape 2 abut one another in the region of the seam 5 that runs helically, whereby the edges of the pile tape 2 are held together by a flat textile tape 6 that is attached to the basic woven fabric 3 from the inside. The textile tape 6 can be selected to be so thin that the cylindrical inside contour of the cover 1 is hardly disrupted.

In the case of the exemplary embodiment shown in FIG. 2, the edges of the pile tape 2 overlap in the region of the helical seam 5, whereby the pile 4 at the edges of the pile tape 2 is shortened in the overlap region 7, to such an extent that the outside contour of the cover 1 is constant, to a great extent. In particular, the pile 4 of the edge that lies underneath, in each instance, is shortened to the height of the basic woven fabric 3 in the overlap region 7, so that the basic woven fabrics of the overlapping edges of the pile tape 2 are directly connected with one another by means of the seam 5.

The invention claimed is:

1. Replaceable cover (1) made of woven pile, in the shape of a cylinder mantle, the pile threads (4) of which project radially outward, wherein the cover (1) consists of an endless, helically wound pile tape (2), the edges of which are connected with one another without the formation of a step that disrupts the cylindrical outside contour, by means of an endless seam (5) that runs helically, wherein the edges of the pile tape (2) abut one another in the region of the helically running seam (5), and are held together by means of a flat textile tape (6) that is attached to a basic woven material (3) from the inside.

2. Cover according to claim 1, wherein the seams (5) are sewn with needle and thread.

3. Cover according to claim 1, wherein the seams are glued.

4. Cover according to claim 1, wherein the seams are bonded.

* * * * *